March 20, 1951     H. C. FRENTZEL     2,545,879
TRAVELER AND BRACE FOR WORMS
Filed Nov. 19, 1948     2 Sheets-Sheet 1
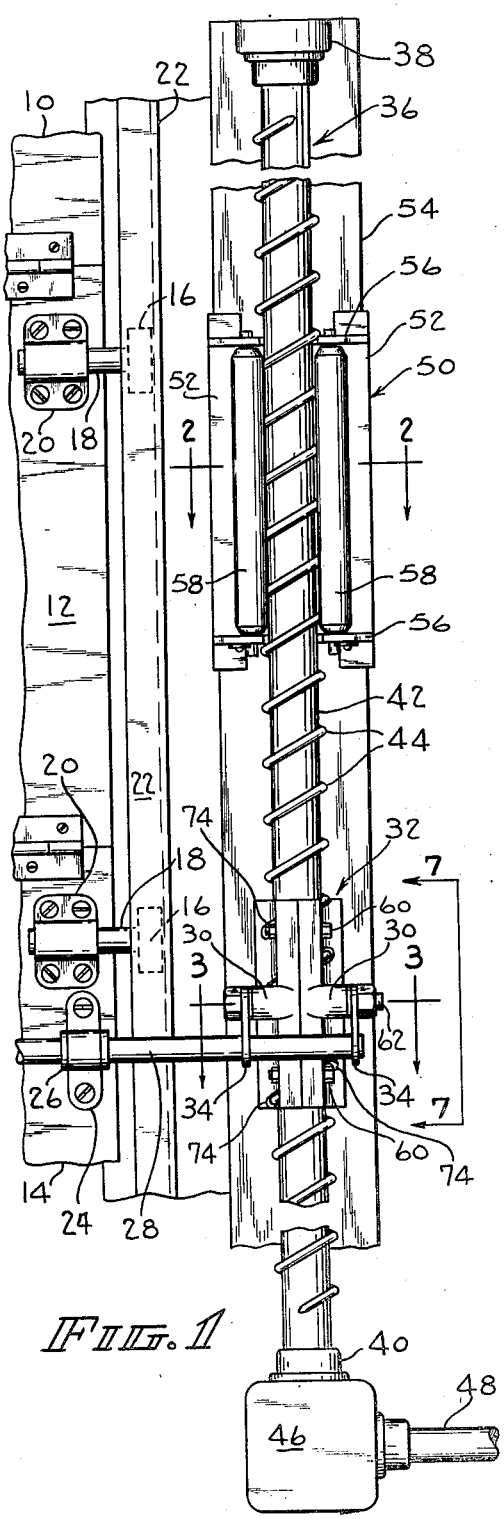
FIG. 1
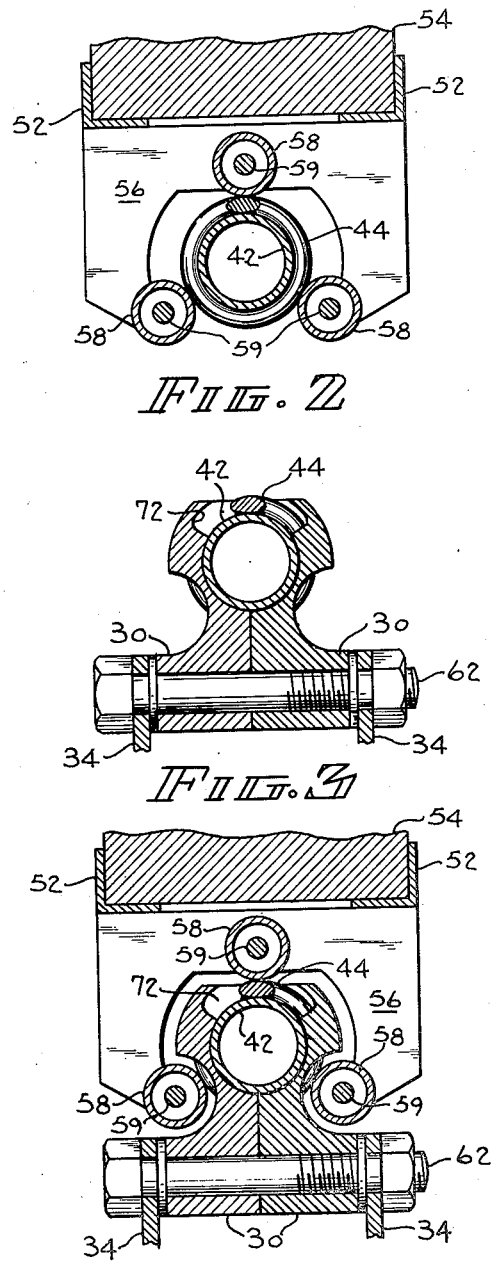
FIG. 2
FIG. 3
FIG. 4
INVENTOR.
HERMAN C. FRENTZEL
BY John W. Michael
ATTORNEY March 20, 1951 H. C. FRENTZEL 2,545,879
TRAVELER AND BRACE FOR WORMS
Filed Nov. 19, 1948 2 Sheets-Sheet 2
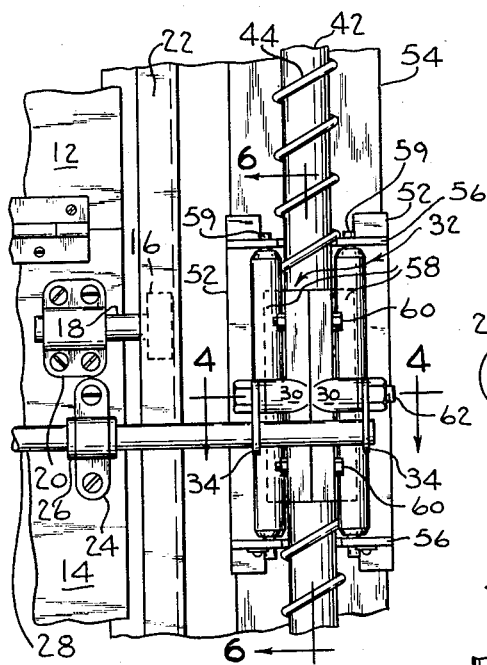
FIG. 5
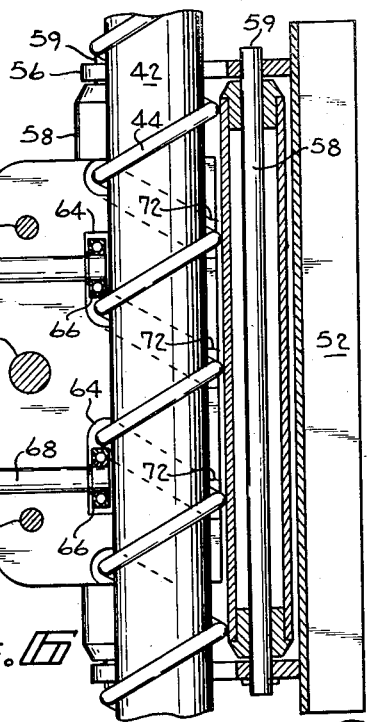
FIG. 6
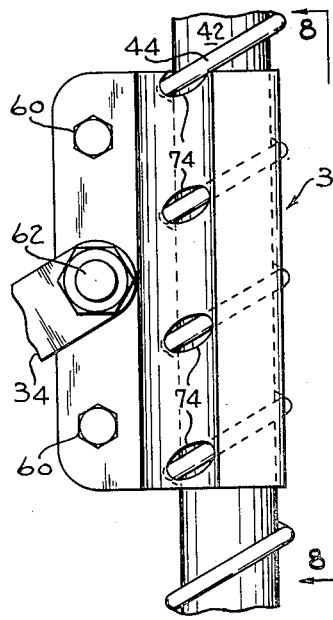
FIG. 7
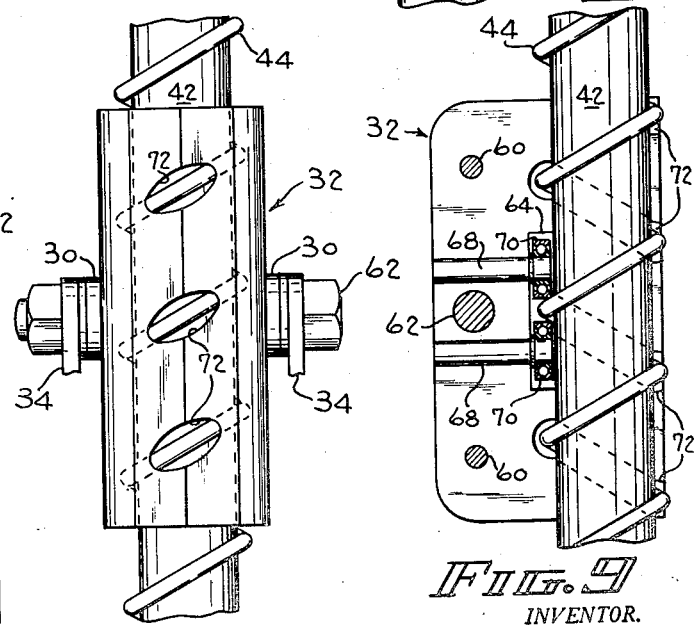
FIG. 8
FIG. 9
INVENTOR.
HERMAN C. FRENTZEL
BY
John W. Michael
ATTORNEY Patented Mar. 20, 1951

2,545,879

UNITED STATES PATENT OFFICE 2,545,879

TRAVELER AND BRACE FOR WORMS

Herman C. Frentzel, Milwaukee, Wis., assignor to McKee Door Company, Aurora, Ill., a corporation of Illinois Application November 19, 1948, Serial No. 60,850

8 Claims. (Cl. 74—424.8)

This invention relates to devices having a worm or screw on which a traveller is adapted to move axially between the ends thereof and particularly to means for supporting or bracing the worm between its ends without interfering with or interference from the axially movable traveller. While this invention permits of use in a multiplicity of devices, the general description will be directed to its use in operating a door.

Power actuated single piece or sectional door assemblies frequently used for garages and the like may be operated by means of a nut or traveller connected to the door and threadably mounted on a vertical shaft or screw which may be rotated to raise or lower the nut and the door. This type of door operation is highly desirable but has been limited to domestic and small commercial installations of no more than about ten feet in height by column action and uneven loading causing the screw to bow and the nut to bind. Of course, the slenderness ratio could be varied with the particular installation, but this would require that such installations be custom built and lose the benefit of mass production economies.

The principal object of this invention is to provide bracing means and traveller means for a worm which mutually cooperate to permit the traveller to move along the worm without interference with or interference from the bracing means.

Another object of this invention is to brace or support a worm or screw between its ends without interfering with a traveller or nut axially movable on the screw between its ends.

Another object is to brace an externally threaded screw between its ends without interfering with the movement of a nut along the screw between its ends.

A further object is to provide a nut adapted for movement along substantially the entire length of a threaded shaft which is braced between its ends.

Another object is to provide a simple device permitting extension of an operating screw of the type described to any desired length.

Still a further object is to provide a door operating assembly of the type described which may be used on any installation without regard for the length of the operating screw.

Another object is to make screw operation of doors available for larger installations such as commercial garage doors and the like which require long operating screws.

Other objects and advantages will be pointed out in, or be apparent from, the specification and claims, as will obvious modifications of the single embodiment shown in the drawings, in which:

Fig. 1 is a fragmentary elevation of a screw operated door assembly;

Fig. 2 is a cross-section of the brace for the screw as viewed from line 2—2 in Fig. 1;

Fig. 3 is a cross-section on line 3—3 of Fig. 1 and shows the operating nut on the screw;

Fig. 4 is a cross-section of the screw and nut as the nut is passing through the brace and is taken on line 4—4 of Fig. 5;

Fig. 5 is a fragmentary elevation showing the nut passing the brace;

Fig. 6 is a longitudinal section on line 6—6 of Fig. 5;

Fig. 7 is a side elevation of the operating nut;

Fg. 8 is a back elevation of the nut as viewed from line 8—8 in Fig. 7; and

Fig. 9 is a view similar to Fig. 6 and shows a modified bearing structure.

Referring to the drawings in detail, Fig. 1 shows a vertically movable door having a plurality of horizontally hinged sections 10, 12, 14, each of which mounts a roller 16 on shaft 18 supported by bracket 20 and sliding in vertical track 22 adjacent the doorway. A plurality of brackets 24 (only one of which is shown) carry bushings 26 through which rod 28 extends for connection to the laterally projecting arms 30 on traveller or operating nut 32 by means of links 34. Nut 32 threadably engages the worm or operating screw 36 which is rotatably supported at its upper and lower ends by means of bearings 38, 40.

Operating screw 36 may be made in any suitable manner, but the embodiment shown is preferred for its simplicity since wire 44 is merely wound on and welded or otherwise secured to tube 42 to form the screw thread. The worm or operating screw 36 may be rotated in the bearings through a bevel gear drive or other means in housing 46 by means of a suitable power source, not shown, driving shaft 48. If the motor turns worm 36 in the clockwise direction, as viewed from above, nut 32, which is confined to axial movement along the screw axis by virtue of its connection to the door, will move along the screw to raise the door. Conversely, if the screw is rotated in a counter-clockwise direction, the door will be lowered.

It should be understood that this type of operation is applicable to horizontal door movement as well as the vertical movement illustrated. Similarly, one piece doors may be operated in this manner.

As pointed out above, in the smaller installations utilizing an operating screw of no longer than ten feet, for example, the operation of this type of actuator is highly desirable, while installations requiring screws of greater length are not satisfactory. To prevent operating screw 36 from bowing when the length of the screw becomes excessive for normal operation, a support 50 is positioned between its ends. This support engages the screw at all times and prevents the screw from bowing in any direction by absorbing the column action and any lateral forces.

The details of the operating screw support 50 may be seen in Figs. 1 and 2 which show a pair of angles 52 mounted on upright post 54. A generally U-shaped bracket 56 is mounted at each end of the pair of angles 52, 52 and more or less straddles screw 36. Three rollers 58 contact the screw thread or wire 44 approximately 120° apart with respect to the center of the operating screw and are carried by pins 59 mounted in brackets 56. Thus it will be seen that rollers 58 readily permit operating screw 36 to rotate while preventing the screw from bending in any direction. Obviously one or more of the rollers could be adjustable to insure contact with the screw at all times.

The operating nut 32 is designed to cooperate with the support 50 to permit the nut to pass along the supported portion of screw 36 without interfering with or interference from the support. Referring to Figs. 3, 7 and 8, it will be seen that operating nut 32 is of a longitudinally split construction wherein two halves are machined or cast and then joined by means of through bolts 60 adjacent each end and by through bolt 62 which extends through arms 30 and additionally serves as the pivot axis for links 34. Nut 32 has internal grooves adapted to threadably engage the screw threading. To permit rough machine work on the two halves, either of the embodiments shown in Figs. 6 and 9 may be utilized to insure smooth running of the nut on the screw. In the embodiment shown in Fig. 6, the nut is provided with a cutout portion 64 receiving ball bearings 66 carried on pin 68 and adapted to engage opposite sides of the screw thread 44 one flight apart. The modification shown in Fig. 9 utilizes similar bearings 70 engaging opposite sides of the thread 44 on the same flight. This construction permits the comparatively crude nut to ride freely on the operating screw.

Referring again in detail to Figs. 3, 7 and 8, it will be seen that the thickness of the traveller is reduced to less than the depth of thread 44 at portions spaced apart by 120° in longitudinal alignment with the rollers. The back side or the side facing the wall is provided with a flat portion of less thickness than the thread depth forming the elliptical shaped openings 72 through which thread 44 projects. Similarly, the sides are longitudinally grooved to reduce the thickness of the nut to less than the thread depth to expose thread 44 through the generally elliptical apertures 74.

Thus as the traveller is moved up along the worm to raise the door from the position shown in Fig. 1 to that shown in Figs. 4, 5 and 6, the rollers 58 remain in contact with that portion of thread 44 projecting through elliptical apertures 72, 74 while the nut passes along the screw. It is elementary that one support positioned at the midpoint will permit the screw length to be doubled and that any number of supports may be utilized to permit of any desired shaft length.

While this invention is particularly applicable in the illustrated environment, it may readily be applied to other uses. For example, this device may be readily applied to overhead conveyor systems and the like. Similarly the device may be used in a horizontal overhead mounting for actuating doors through a connection from the nut to the top center of the upper door panel. Changes in the structures shown will occur to those skilled in the art. Accordingly, this invention is limited only by the scope of the claims.

I claim:

1. A mechanism including a screw, bracing means located between the screw ends and preventing bending of the screw, and a nut engaging the screw and movable along the length of the screw, said nut moving between the bracing means and the screw as the nut passes that portion of the screw where the bracing means are located.

2. The combination with a screw, of bracing means permanently contacting the tops of the screw threads and preventing the screw from bending, and a nut engaging the screw for movement along the screw, said nut having a transverse cross-sectional thickness less than the thread depth where the nut lies between the bracing means and the screw as the nut moves along the screw past the bracing means.

3. The combination with a screw having a tendency to bend, of support means located between the ends to prevent bending of the screw, said support means contacting the screw thread at a plurality of circumferentially spaced points, and a nut threaded onto the screw and having a plurality of reduced thickness portions circumferentially spaced similar to the contact points between the support means and the screw thread, the transverse cross-sectional thickness of said portions being less than the screw thread depth to expose the thread so that contact between the support means and the thread is maintained while the nut moves past the support means in response to relative rotation between the screw and the nut.

4. The combination with a rotatable screw, of a plurality of rollers parallel to the axis of the screw and contacting the screw threads at circumferentially spaced points to prevent the screw from bending, and a nut threaded on the screw for movement along the screw when the screw is rotated, said nut having circumferentially spaced reduced portions corresponding to the contact points between the rollers and the screw, the transverse cross-sectional thickness of the reduced portions being less than the thread depth to expose the threads to contact with the rollers even while the nut moves along the braced portion of the screw.

5. The combination with a rotatable screw, of three rollers parallel to the axis of the screw and contacting the screw threads at circumferentially spaced points to prevent the screw from bending, and a nut threaded on the screw for movement along the screw when the screw is rotated, said nut having three circumferentially spaced reduced portions corresponding to the contact points between the rollers and the screw, the transverse cross-sectional thickness of the reduced portions being less than the thread depth to expose the threads to contact with the rollers even while the nut moves along the braced portion of the screw.

6. The combination with a screw, of bracing means permanently contacting the screw threads and preventing the screw from bending, and a member completely encircling the screw for movement along the screw in response to relative rotation therebetween, said member being dimensioned to expose the screw threads to permit the member to move along the screw past the bracing means.

7. The combination with a rotatable screw, of a plurality of rollers parallel to the axis of the screw and contacting the screw threads at circumferentially spaced points to prevent the screw from bending, and a member completely encircling the worm and dimensioned to expose the worm threads and being movable along the worm in response to relative rotation between the member and the worm.

8. The combination with a rotatable screw, of three rollers parallel to the axis of the screw and contacting the screw threads at circumferentially spaced points to prevent the screw from bending, and a member completely encircling the worm and dimensioned to expose the worm threads and being movable along the worm in response to relative rotation between the member and the worm.

HERMAN C. FRENTZEL.

REFERENCES CITED

The following references are of record in the file of this patent:

UNITED STATES PATENTS

| Number | Name | Date |
|---|---|---|
| 158,976 | Pfantz et al. | Jan. 19, 1875 |
| 428,639 | Siccardi | May 27, 1890 |
| 1,065,801 | Hammers | June 24, 1913 |
| 1,193,672 | DeGroot | Aug. 8, 1916 |
| 1,268,048 | Norman | May 28, 1918 |
| 1,375,781 | De Long | Apr. 26, 1921 |
| 1,523,276 | Nordin | Jan. 13, 1925 |
| 1,990,166 | Brodsky | Feb. 5, 1935 |
| 2,293,218 | Rieber | Aug. 18, 1942 |
| 2,441,168 | Richardson | May 11, 1948 |